United States Patent [19]

Gundersen et al.

[11] Patent Number: 5,651,807
[45] Date of Patent: Jul. 29, 1997

[54] METHOD FOR TREATMENT OF RESIDUES FROM ORGANOCHLOROSILANE AND/OR CHLOROSILANSYNTHESIS

[75] Inventors: Roald Gundersen, Vennesla; Inger Johanne Eieland, Oslo; Ragnhild Jensen, Kristiansand, all of Norway

[73] Assignee: Elkem a/s, Norway

[21] Appl. No.: 537,932

[22] PCT Filed: Mar. 2, 1995

[86] PCT No.: PCT/NO95/00045

§ 371 Date: Oct. 26, 1995

§ 102(e) Date: Oct. 26, 1995

[87] PCT Pub. No.: WO95/27086

PCT Pub. Date: Oct. 12, 1995

[30] Foreign Application Priority Data

Mar. 30, 1994 [NO] Norway ..................................... 941173

[51] Int. Cl.⁶ .................. C22B 7/00; C22B 4/00; C22B 3/06
[52] U.S. Cl. .................. 75/10.48; 75/10.53; 75/424; 423/349
[58] Field of Search .................. 75/10.48, 10.5, 75/10.53, 641, 419, 424; 423/348, 350, 349

[56] References Cited

U.S. PATENT DOCUMENTS 4,224,297 9/1980 Straussberger et al. ............... 423/348
4,758,352 7/1988 Feldner et al. .
5,274,158 12/1993 Webb et al. .
5,306,328 4/1994 Streckel et al. ............... 75/373
5,427,952 6/1995 Daugherty et al. ............... 423/348

FOREIGN PATENT DOCUMENTS

| 141125 | 5/1985 | European Pat. Off. . |
| 901889 | 1/1954 | Germany . |
| 2842840 | 4/1979 | Germany . |
| 3201312 | 7/1983 | Germany . |
| 3523541 | 1/1987 | Germany . |
| 4205980 | 9/1993 | Germany . |
| 4227568 | 11/1994 | Germany . |
| 1581418 | 12/1980 | United Kingdom . |
| 8605211 | 9/1986 | WIPO . |

*Primary Examiner*—Melvyn Andrews
*Attorney, Agent, or Firm*—Bierman, Muserlian and Lucas

[57] ABSTRACT

The present invention relates to method for treatment of residues originating from organochlorosilanes- and/or chlorosilane syntheses. The residues are, optionally together with an oxidation agent, supplied to a smelting furnace where the residues are melted in order to form a molten metallic phase comprising at least of silicon and copper and a slag phase, tapping of the metallic melt and an inert slag from the smelting furnace. Copper is dissolved from the solidified silicon-copper containing metallic phase by leaching with a mineral acid in order to produce a solid product substantially containing silicon, whereafter copper is recovered from the leach solution.

9 Claims, No Drawings

METHOD FOR TREATMENT OF RESIDUES FROM ORGANOCHLOROSILANE AND/OR CHLOROSILANSYNTHESIS

TECHNICAL FIELD

The present invention relates to a method for treatment of residue from methylchlorosilane synthesis, where silicon is reacted with methylchloride in the presence of a copper catalyst and residues from chlorosilanesynthesis, where silicon is reacted with hydrogenchloride.

BACKGROUND ART

Methylchlorosilane synthesis, also called direct synthesis, is carried out in fluidized bed reactors. During the process a part of fine particulate silicon and copper catalyst particles are together with metallic compounds, especially iron- and aluminium compounds, which are present in the silicon raw material, are removed from the reactor together with the gaseous reaction products, a mixture of silanes, and unreacted methylchloride. The solid materials are separated from the mixture of silanes and unreacted methylchloride in separating devices such as for example cyclones. In addition a residue will remain in the reactor, comprising silicon, copper and metal halides formed from compounds in the silicon raw materials and also comprising carbon deposits formed by decomposition of methylchloride. This residue is continuously or intermittently removed from the reactor.

Elemental copper, copper oxides, copper formate, copper hydroxides and other copper salts like copper chloride are used as a copper catalyst. The copper catalyst may further contain metals or metal compounds as activators, such as zinc, and zinc compounds, or promotors such as antimony, cadmium, phosphorus, tin, arsenic etc. in order to improve the reactivity and the selectivity of the produced silanes.

These residues have up till now normally been deposited in waste disposal sites. However, as the residues normally contain 1–10% by weight of copper, mainly in elemental form, copper may be leached from the residue which represents a danger for pollution of ground water. It is therefore no longer acceptable to deposit this type of residue in disposal sites.

A number of methods for recovering copper from the above mentioned residues have been proposed. Thus from German patent No. 901889 it is known to treat residue from the reactor in water and diluted hydrochloric acid under addition of chlorine gas in order to leach copper as divalent copper chloride and remove the remaining solid residue from the solution whereafter divalent copper chloride in the leach solution is reduced to cuprous chloride which is crystallized and used as a copper catalyst in the direct synthesis. The remaining solid residue, which mainly contains silicon, must, however, be deposited. In addition it is difficult to obtain a complete crystallization of cuprous chloride from the leach solution, making it necessary to subject the final solution to further treatment From DE-A1 3523541 it is known a method for treatment of a hydrolysis residue from organochlorosilane production, where the residue is oxidized by sodium hypochlorite in order to leach copper from the residue. After removal of the solids from the leach solution, an alkaline earth- or alkaline hydroxide or an alkaline carbonate is added in order to precipitate copper oxides, hydroxides or carbonates. Also in this process the undissolved solid material, which mainly contains silicon, is deposited.

In U.S. Pat. No. 4,758,352 it is proposed to oxidize hydrolysis residue by using an oxygen containing gas. Also in this process only copper is recovered, while a silicon containing residue is deposited.

In DE-A 4205980 it is proposed to treat residue from direct synthesis by diluted sulphuric acid at elevated temperatures in order to dissolve copper and where copper can be precipitated as for example cuprous chloride or as copper-II-oxalate or where copper can be recovered by electrolysis. It is further disclosed in DE-A 4205980 that a solid silicon residue is obtained which can be used in metallurgical processes or which can be deposited. Chemical analysis of the obtained silicon residue is, however, not given.

By all the above-mentioned processes the residues are subjected to a leaching process in order to dissolve and recover copper while the undissolved solid matter is normally deposited. By the leaching process the leach solutions will, in addition to copper, contain a number of other metal ions such as iron and aluminium. The leach solutions must therefore be further purified before they can be discharged.

DISCLOSURE OF INVENTION

It is an object of the present invention to provide a method for treatment of residues originating from direct synthesis of organochlorosilanes and/or chlorosilanes where both copper and silicon are recovered in the form of valuable producing and where an inert slag is produced which can be used as a filler material or which can be deposited without any restrictions. By "inert slag" it is understood a material which satisfies the requirements set to an inert material in Review of Regulatory Situation on Waste at EC and OECD Levels, published February 1993.

Accordingly, the present invention relates to a process for treatment of residues originating from organochlorosilanes, and/or chlorosilane syntheses, said method being characterized in that the residues, optionally together with an oxidation agent, are supplied to a smelting furnace wherein the residues are melted and forms a molten metallic phase comprising at least silicon and copper and a slag phase, tapping of the molten metallic phase and an inert slag from the furnace, leaching of copper from the solidified silicon- and copper containing metallic phase by use of a mineral acid in order to recover a solid product containing at least silicon and recovering of copper from the leach solution.

According to a preferred embodiment the residues are dried and agglomerated before they are supplied to the smelting furnace. The agglomeration is carried out by conventional methods such as for example pelletizing using a suitable binder. Alternatively the residues can be supplied to the smelting furnace in powder form by injection through a hollow electrode or by injection through a lance or through nozzles arranged in the furnace bottom or in the furnace body. When the residues are supplied through a hollow electrode or injected through lances or nozzles directly into the molten bath, the residues can either be in powder form or agglomerated form.

If necessary CaO, $SiO_2$ or $Al_2O_3$ are added as slag forming materials in order to produce a calcium silicate or a calcium aluminate silicate slag which is liquid at the temperature in the smelting furnace and is inert after solidification. The basicity of the slag defined for example as weight ratio $CaO/SiO_2$ is preferably adjusted within the range of 0.5 to 3.0.

The smelting process may be carried out in plasma heated furnaces or in furnaces equipped with graphite- or carbon electrodes. The current supply can be direct current or alternate current. Both open, semi-closed or closed smelting furnaces can be used. The use of a closed smelting furnace gives, however, the best control of gas production. This may be an advantage as to amount of gas and to avoid outlet of dioxine to the environment.

It has surprisingly been found that by the method of the present invention the metallic phase will solidify in the form of a silicon matrix containing copper in the form of intermetallic phases, especially $Cu_3Si$ and $CaCu_2Si_2$. It has further been found that the Cu-Si compounds such as $Cu_3Si$ and $CaCu_2Si_2$ are easily leachable in mineral acids. A mineral acid such as hydrochloric acid is preferably used but other mineral acids like sulphufic acid, nitric acid and phosphoric acid can also be used. During leaching the copper containing phases will dissolve, while the remaining solid silicon containing matrix is filtered from the leach solution and can be used as an additive in the production of steel and cast iron or it can be used as a reduction agent in silicothermal production of metals or metal alloys. An oxidizing agent such as hydrogen peroxide ($H_2O_2$) can be included in the leach solution.

The leaching can be done at a temperature between 0° and 100°C., but is preferably performed at ambient temperature.

Copper is recovered from the leach solution by known methods, such as for example by cementation and the produced copper can be used for a number of applications.

As oxidizing agent a metal oxide or an oxygen containing gas can be used. The purpose of the supply of an oxidation agent is to oxidize any elemental carbon present in the residue.

According to a preferred embodiment, an iron oxide source is added as the oxidation agent to the smelting furnace in an amount sufficient to oxidize the elemental carbon present in the residue. In this case the molten metallic phase will, in addition to silicon and copper, contain iron which during the solidification of the metallic phase will form a $FeSi_2$ intermetallic phase.

During the smelting of the residue some amorphous silica dust will be formed which will follow the off gas from the furnace. This silica dust can be recovered from the off gas in for example a bag house filter and can be used as a binder for producing agglomerates of the residue or it can be used as an additive in the production of concrete and mortar. Alternatively the gas can be cleaned by wet cleaning, whereby the amorphous silica can be recovered in form of a liquid slurry.

DETAILED DESCRIPTION OF PREFERRED EMBODIMENTS

Example 1

Cu-containing hydrolysed residue from a methylchlorosilane reactor was micropelletized by using a binder which, based on the weight of the micropellets, consisted of 2% by weight of amorphous silica dust, 3% by weight of slaked lime, 2% by weight of an aqueous sugar solution and additional water in an amount of up to 17% by weight. The particle sizes of the produced micropellets were in the range between 1 and 3 mm. Elemental analysis of the produced pellets is given in Table 1.

TABLE 1

Elemental analysis of pellets

| Element | Weight % |
| --- | --- |
| Fe | 2.0 |
| Zn | 0.02 |
| Cu | 4.4 |
| Mn | 0.03 |
| Cr | 0.01 |
| Ti | 0.10 |
| Ca | 0.8 |
| Al | 0.32 |
| Mg | 0.02 |
| C | 5.0 |
| Cl | 0.13 |
| Si | 74.2 |
| Remainder | Oxygen |

The produced pellets were supplied to a closed smelting furnace equipped with a graphite electrode and with a bottom contact. The furnace was operated with alternating current. Before starting the supply of residue to the furnace, a start melt comprising a molten silicon phase and a liquid slag phase consisting of about 55% by weight CaO and about 45% by weight of $SiO_2$ was provided in the furnace.

The residue pellets together with further CaO and $SiO_2$ as slag forming materials and $Fe_2O_3$ were supplied to the furnace. The purpose of the supply of $Fe_2O_3$ was to oxidize elemental carbon in the residue.

From the smelting furnace a molten metallic phase was tapped containing silicon, copper and iron and a slag which after solidification is inert. The chemical composition of the solidified metallic phase is shown in Table 2 and the chemical composition of the slag is shown in Table 3. The off gas from the furnace was cleaned in a wet cleaning apparatus. From the wet cleaning apparatus, a sludge consisting essentially of $SiO_2$ was recovered.

TABLE 2

Composition of Si—Fe—Cu-phase.

| Element | Weight % |
| --- | --- |
| Al | 0.10 |
| Ca | 0.48 |
| Ti | 0.17 |
| Fe | 11.7 |
| Cu | 5.15 |
| Si | 83.0 |
| $O_2$ | 21,0 |

TABLE 3

Composition of slag.

| | Weight % |
| --- | --- |
| CaO | 44.4 |
| FeO | 1.2 |
| MgO | <0.01 |
| $TiO_2$ | 0.05 |
| MnO | 0.03 |
| ZnO | 0.014 |
| PbO | <0.01 |
| $SiO_2$ | 50.8 |
| $Al_2O_3$ | 1.4 |

The silicon-copper-iron alloy was crushed and subjected to a leaching step where it was leached at room temperature using a 1 molar hydrochloric acid solution and $H_2O_2$ as an oxidizing agent, whereby the copper silicide phases were dissolved and the alloy thus desintegrated. The leach solution was filtered from the undissolved solid material and forwarded to a copper recovery step. The solid undissolved material consisted of a silicon-iron alloy having a chemical analysis as shown in Table 4. This alloy can be used as an additive in the production of steel or cast iron or it can be used as a reduction material in silicothermic production of metals or alloys.

TABLE 4

Chemical analysis of Si—Fe alloy.

| Element | Weight % |
|---|---|
| Fe | 11.0 |
| Cu | 0.30 |
| Al | 0.05 |
| Ca | 0.10 |
| Ti | 0.11 |
| Si | 87.0 |
| $O_2$ | <1 |

In the copper recovery step copper was recovered from the leach solution by cementation by addition of iron particles to the solution. The produced copper can for example be used as a catalyst in the methylchlorosilane synthesis or it can be sold as a copper source for a number of different applications.

Example 2

The smelting test from example 1 was repeated in a closed plasma heated furnace. Residue pellets with a composition as shown in Table 2 were supplied to the plasma furnace after a start melt of silicon and a slag consisting of about 55% by weight CaO and about 45% by weight $SiO_2$ was established in the furnace. Also in this smelting test the residue pellets together with CaO and $SiO_2$ as slag forming materials and $Fe_2O_3$ as the oxidation agent for elemental carbon was supplied to the molten slag bath.

From the plasma furnace a silicon-copper-iron alloy was taped having a composition as shown in Table 5 and a slag having essentially the same composition as in example 1 and shown in Table 3.

TABLE 5

Composition of Si—Fe—Cu-alloy

| Element | Weight % |
|---|---|
| Al | 0.40 |
| Ca | 1.3 |
| Ti | 0.13 |
| Fe | 11.6 |
| Cu | 4.1 |
| Si | 82.0 |
| $O_2$ | <1.0 |

The silicon-copper-iron alloy was crushed and subjected to a leaching step where it was leached using the same procedure as described in example 1. The undissolved material consisted of a silicon-iron alloy having a chemical composition as shown in Table 6.

TABLE 6

Chemical analysis of Si—Fe alloy

| Element | Weight % |
|---|---|
| Fe | 13.2 |
| Cu | 0.36 |
| Al | 0.03 |
| Ca | 0.019 |
| Ti | 0.13 |
| Si | 86.0 |
| $O_2$ | <1.0 |

As shown in table 6 a Si-Fe alloy was obtained having substantially the same composition as the alloy obtained in example 2.

The copper content of the leach solution was recovered from the leach solution by cementation by iron addition.

We claim:

1. Method for treatment of residues containing silicon and copper originating from organochlorosilanes- and/or chlorosilane syntheses, comprising:
   supplying said residues, optionally together with an oxidation agent, to a smelting furnace;
   melting said residues in said furnace to form a molten metallic phase comprising at least silicon and copper and a slag phase;
   tapping said furnace to recover the silicon and copper containing molten metallic phase and an inert slag from the furnace;
   leaching of copper from the silicon- and copper containing metallic phase by use of a leach solution comprising a mineral acid;
   recovering a solid product containing at least silicon; and recovering copper from the leach solution.

2. Method according to claim 1, further comprising the steps of drying and agglomerating said residue before supplying said residue to the furnace.

3. Method according to claim 1, wherein said residue is supplied to the smelting furnace by injecting said residue as a powder through a hollow electrode or a lance or nozzles arranged in the smelting furnace.

4. Method according to claim 1, further comprising the step of adding to said furnace CaO and/or $SiO_2$ and/or $Al_2O_3$ as slag forming materials in order to produce a liquid slag.

5. Method according to claim 1, further comprising the step of adjusting the basicity of said slag phase in said furnace to within a range of 0.5 to 3.0, basicity being defined as weight ratio $CaO/SiO_2$ in said slag phase.

6. Method according to claim 1, wherein said oxidizing agent is a metal oxide or an oxygen containing gas.

7. Method according to claim 6, wherein said metal oxide is iron oxide.

8. Method according to claim 1, wherein said leach solution further comprises an oxidizing agent and said mineral acid is selected from the group consisting of hydrochloric acid, sulphuric acid, nitric acid and phosphoric acid.

9. Method according to claim 4, further comprising the step of adjusting the basicity of said slag phase in said furnace to within a range of 0.5 to 3.0, basicity being defined as weight ratio $CaO/SiO_2$ in said slag phase.

* * * * *

UNITED STATES PATENT AND TRADEMARK OFFICE
CERTIFICATE OF CORRECTION

PATENT NO. : 5,651,807
DATED : July 29, 1997
INVENTOR(S) : Roald Gundersen et al.

It is certified that error appears in the above-indentified patent and that said Letters Patent is hereby corrected as shown below:

Column 2, line 24, change "producing" to --products--.

Column 5, line 43, change "taped" to --tapped--.

Signed and Sealed this

Twenty-fifth Day of November, 1997

*Attest:*

BRUCE LEHMAN

*Attesting Officer*   *Commissioner of Patents and Trademarks*